(12) United States Patent
Nilsson

(10) Patent No.: US 7,373,117 B2
(45) Date of Patent: May 13, 2008

(54) POWER CONTROL IN TELECOMMUNICATIONS NETWORKS

(75) Inventor: Johan Nilsson, Hollviken (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 10/528,639

(22) PCT Filed: Sep. 23, 2003

(86) PCT No.: PCT/EP03/10588

§ 371 (c)(1),
(2), (4) Date: Sep. 28, 2005

(87) PCT Pub. No.: WO2004/028029

PCT Pub. Date: Apr. 1, 2004

(65) Prior Publication Data

US 2006/0025087 A1   Feb. 2, 2006

Related U.S. Application Data

(60) Provisional application No. 60/500,427, filed on Sep. 5, 2003, provisional application No. 60/422,939, filed on Oct. 31, 2002.

(30) Foreign Application Priority Data

Sep. 23, 2002  (GB) .................................. 0222073.9
Jun. 30, 2003  (GB) .................................. 0315290.7

(51) Int. Cl.
*H04B 17/00*   (2006.01)

(52) U.S. Cl. ................................. 455/115.1; 455/115.2; 455/115.3; 455/226.1; 375/134; 375/137; 375/224

(58) Field of Classification Search .................. 455/84, 455/561, 570, 571, 574; 375/1
See application file for complete search history.

(56) References Cited

U.S. PATENT DOCUMENTS 5,216,692 A * 6/1993 Ling ............................ 375/130
5,732,334 A * 3/1998 Miyake ....................... 455/126
5,852,782 A * 12/1998 Komatsu ..................... 455/522
6,131,013 A * 10/2000 Bergstrom et al. .......... 455/63.1

(Continued)

FOREIGN PATENT DOCUMENTS

EP   1 067 706     3/2004
WO   WO- 00/65748  11/2000

OTHER PUBLICATIONS

Karl Johan, et al.; "PID Controllers: Theory, Design and Tuning"; Instrument Society of America; Research Triangle Park, NC; second edition; 1995; Chapter 3: pp. 59-119.

(Continued)

*Primary Examiner*—Nay Maung
*Assistant Examiner*—Richard Chan
(74) *Attorney, Agent, or Firm*—Michael Cameron

(57) ABSTRACT

A radio frequency transmitter is power controlled using a controlling system including an integrating controller, together with an inner and an outer control loop. A tracking signal supplied by the inner loop to the integrating controller of the outer loop is used to avoid windup problems when the transmitted power is saturated.

8 Claims, 2 Drawing Sheets

U.S. PATENT DOCUMENTS

| | | | |
|---|---|---|---|
| 6,353,623 B1 * | 3/2002 | Munks et al. | 372/20 |
| 6,449,462 B1 | 9/2002 | Gunnarsson et al. | |
| 2002/0021682 A1 * | 2/2002 | Ariyoshi et al. | 370/335 |
| 2003/0148769 A1 | 8/2003 | Chi et al. | |

OTHER PUBLICATIONS

Gunnarsson, Fredrik et al., "Power Control in Wireless Communications Networks—From A Control Theory Perspective"; XP002274367, Feb. 7, 2002, (12 pgs).

* cited by examiner

POWER CONTROL IN TELECOMMUNICATIONS NETWORKS

This patent application claims the benefit of priority from U.S. Provisional Patent Application Ser. No. 60/422,939 filed on Oct. 31, 2002, and U.S. Provisional Patent Application Ser. No. 60/500,427 filed on Sep. 5, 2003. This application incorporates by reference the entire disclosure of U.S. Provisional Patent Application Ser. Nos. 60/422,939 and 60/500,427.

The present invention relates to power control in telecommunications networks, and, in particular, in RF mobile telephone networks and systems.

BACKGROUND OF THE INVENTION

Power control is important in mobile telephone networks, for example, because it is important to obtain desirably high capacity and efficiency, particularly in CDMA systems. The variable that is controlled is called quality. Quality of the communication is controlled with reference to a quality measure such as: BER (Bit Error Rate), FER (Frame Erasure Rate, BLER (Block Error Rate), number of iterations of a turbo decoder, or the average reliability of decision statistics. Below, for the sake of brevity, the quality measurement will be referred to as BLER. It will, however, be readily appreciated that BER or FER, or other quality measurement could be used.

Usually an integrating controller is provided to achieve a steady state performance with zero control error. The control scheme used is cascade control, see for example FIG. 1 of the accompanying drawings. The idea with cascade control is to make an inner control loop (2) much faster than an outer control loop (4). For transmission power control (TPC) the inner loop controls another quality measure such as for example the signal to interference ratio (SIR). The outer loop sets the SIR reference value $SIR_r$ for the inner loop. The goal of the outer loop is to control the SIR reference value to achieve a BLER that is equal to the BLER reference $BLER_r$. To get a control system that in steady state achieves a BLER that is equal to the BLER reference, an integrating controller (9), which can be, for example, a PI controller, a PID controller, or a pure integrating controller, can be used. The cascade controller illustrated in FIG. 1 comprises an inner control loop (2) and an outer control loop (4). Both control loops have an input of a received signal (y(k)). In the outer control loop 4, the BLER is estimated in a BLER estimation unit (5) and compared with a BLER reference signal. A subtractor (7) calculates the difference between the reference signal and the BLER estimate to supply an input signal to an integrating controller (9). The integrating controller (9) produces a SIR reference signal.

The SIR reference signal is compared with an SIR estimate from an SIR estimation unit (3) in the inner control loop (2). The difference between the SIR reference and the SIR estimate is supplied to a function, for example a step function (11) for determining a command u(k) that sets transmission power. More generally, the SIR estimate and the SIR reference value could both be supplied to a function that determines a command u(k) for setting the transmission power.

A known problem with an integrating controller (such as a PI, PID, or pure integrating controller) is that it becomes unstable if the control signal saturates. This problem is often referred to as the windup problem. Transmission power control (TPC) saturation of the control signal corresponds to situations when the maximum (or minimum) transmitter power is used.

The windup problem in the power control algorithms for third generation mobile telephony systems is well known. The specific problem of windup protection in WCDMA makes several additions to anti-windup schemes used in other areas necessary.

As is well known, integrating controllers have the nice property of being able to achieve zero control error in steady state. As an example of an integrating controller, a continuous time PI-controller is shown in FIG. 2. Discrete time controllers have similar behaviour; see, for example, Karl Johan Åström and Tore Hägglund, "PID Controllers: Theory, Design and Tuning", Instrument Society of America, Research Triangle Park, N.C., second edition, 1995.

A known problem with integrating controllers is that the integrator part turns unstable when the control signal saturates. This instability occurs because feedback from the process is needed to stabilize the controller, which is not open loop stable. In the case of transmission power control, saturation can occur when maximum (or minimum) transmission power is used. In this situation the transmission power can only be decreased (or increased in the case of a minimum), which can be seen as open loop operation of the integrator.

As the controller is not open loop stable the controller state (the integrator, I-part) can start to build up a large state. This usually results in that it takes a long time for the control loop to start functioning again after the saturation state is left. This problem is usually referred to as the windup problem.

SUMMARY OF THE PRESENT INVENTION

According to one aspect of the present invention there is provided a method for controlling a radio frequency (RF) transmitter, the method comprising:

using an integrating controller to produce a reference value of a first quality measure from a first error signal;

producing an estimated value of the first quality measure relating to an actual value of the first quality measure; and supplying a tracking signal related to the estimated value of the first quality measure and the reference value of a first quality measure to the reference integrating controller.

According to another aspect of the present invention, there is provided a controller for controlling a radio frequency (RF) transmitter, the method comprising:

an integrating controller operable to produce a is reference value of a first quality measure from a first error signal;

an estimator operable to produce an estimated value of the first quality measure relating to an actual value of the first quality measure; and a tracking unit operable to supply a tracking signal related to the estimated value of the first quality measure and the reference value of a first quality measure to the reference integrating controller.

It is emphasised that the term "comprises" or "comprising" is used in this specification to specify the presence of stated features, integers, steps or components, but does not preclude the addition of one or more further features, integers, steps or components, or groups thereof.

DETAILED DESCRIPTION OF THE PREFERRED EMBODIMENT

Figure 1:
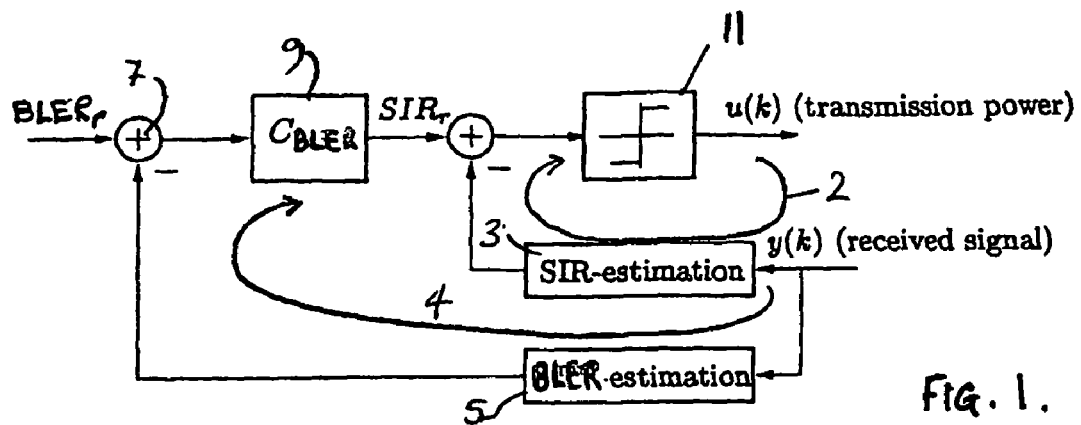
FIG. 1 illustrates a controller for a third generation mobile system.
Figure 2:
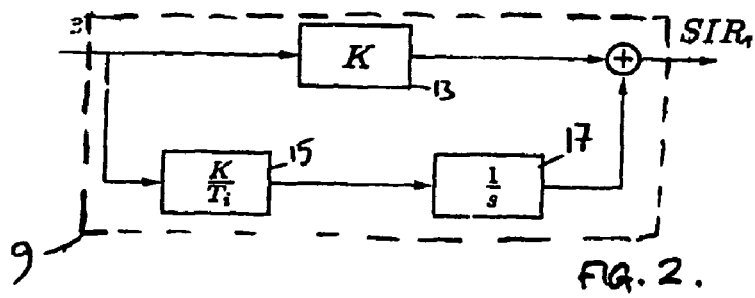
FIG. 2 illustrates an integrating controller.
Figure 3:
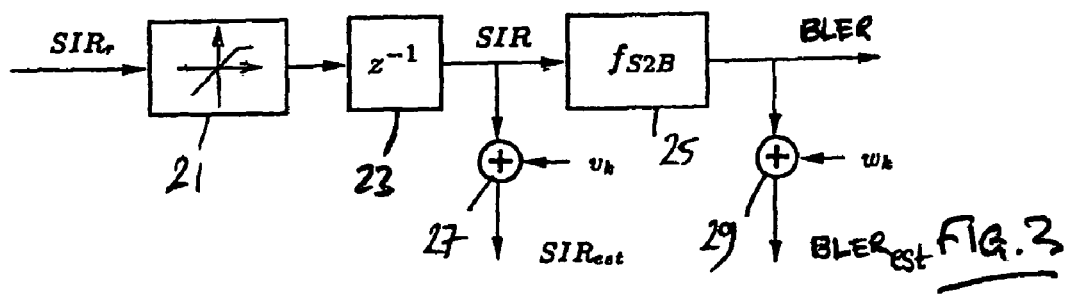
FIG. 3 illustrates a simplified model of a quality control process.

To explain the present invention, a simplified model for the quality control process is illustrated in FIG. 3. The SIR control loop is modelled as a saturation (21) and a delay (23).

The process that maps SIR to BLER is modelled as a static function (25). This is not important for the invention and can be modelled by any suitable means. A problem is that SIR and BLER cannot be directly measured. SIR and BLER can only be estimated. This is indicated in FIG. 3 with two estimation noises $v_k$ and $w_k$. BLER is usually estimated by evaluating the CRC flags of received blocks for a period of time.

In WCDMA systems, SIR is usually estimated by using so-called pilot symbols transmitted from the base station. Pilot symbols are predetermined symbols that are known to both the base station and the mobile terminal. By observing how the pilot symbols are received in the mobile terminal, the SIR can be estimated. The estimation is split in two parts, estimation of signal power, and estimation of interference power. The signal power is estimated by observing with what power the pilot symbols are received. The interference power is estimated by observing how large variation that is seen in the received pilot symbols. The estimated SIR is then calculated as the ratio of the signal power estimate and the interference power estimate.

When transmission power saturates (i.e. when the maximum or minimum transmission power is used) the actual and estimated SIR will no longer follow $SIR_r$ (SIR reference). In the tracking approach of the present invention the difference between the estimated SIR and $SIR_r$ is calculated and fed back to stabilize the integrating controller. If $v_k$ is small the difference will be small, except when the transmission power is saturated.

Figure 4:
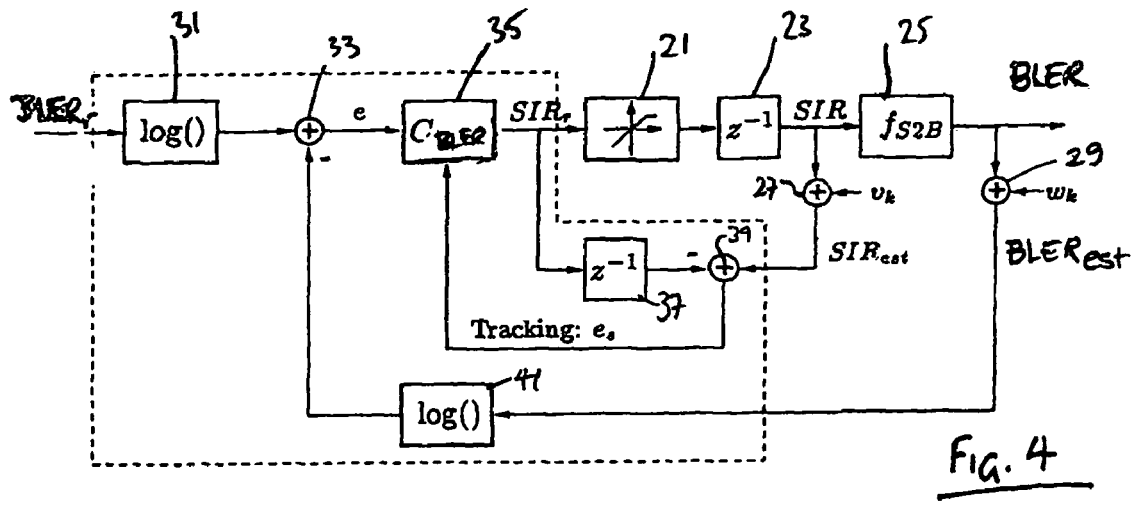
FIG. 4 illustrates a controller according to an exemplary embodiment of the present invention.

FIG. 4 is a schematic illustration of a tracking solution according to an exemplary embodiment of the present invention. The components of FIG. 3 are shown, namely the saturation (21), delay (23) and the static mapping function (25). A reference SIR ($SIR_r$) is input to this model to produce an SIR estimate ($SIR_{est}$) and a BLER estimate ($BLER_{est}$).

A reference BLER ($BLER_r$) is supplied via a log function (31) to a subtractor (33). Also supplied the subtractor (33) is the BLER estimate, via a log function (41), so that the subtractor (33) produces an error e in the desired quality measure, the error being equal to the difference between the reference BLER and the estimated BLER. The log functions are introduced to ensure that the control loop behaves in a linear fashion, and is not important for the invention.

The tracking solution is illustrated by elements (35), (37), and (39). A controller 35 (C-BLER) receives as one input the error signal e. The controller also receives a tracking signal $e_s$. The controller produces a signal representing the reference SIR for supply to the SIR control loop. The reference SIR signal is also supplied, via a delay element 37, to a subtractor 39 which produces the tracking signal by subtracting the delayed reference SIR signal $SIR_r$ from the estimated SIR signal $SIR_{est}$.

Figure 5:
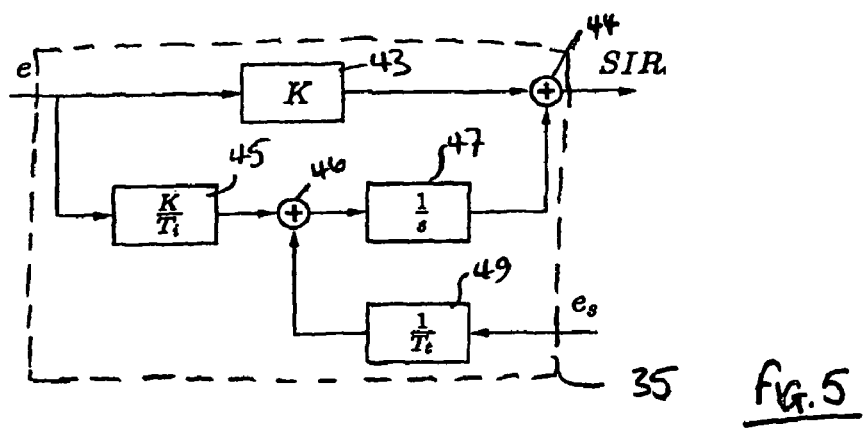
FIG. 5 illustrates the PI controller of FIG. 2 with a tracking signal input.

A PI-controller with tracking signal input to the integrator is shown in FIG. 5. As before, a continuous time loop is shown, but a discrete time version is easily derived and would have similar behaviour.

FIG. 5 illustrates an exemplary controller 35 in more detail. As can be seen, the controller includes a gain element 43 of gain K which receives an input e and supplies an output e*K to an adder 44. The error signal e is also supplied to a component 45 having a transfer function $K/T_i$ (where $T_i$ is the integration time) whose output is supplied to an adder 46. A second input of the adder 46 is provided by the output from a second component 49 having a transfer function $1/T_t$ (where $T_t$ is the tracking time) as supplied with the error signal $e_s$. The output of the adder 46 is integrated by the integrator 47 (1/s) and supplied to the adder 44. The output of the adder 44 gives the reference SIR signal. It can be seen that the controller 35 provides the following transfer function as given in equation 1.

$$SIR_r = e^*K + \frac{1}{s}\left(\frac{e^*K}{T_i} + \frac{e_s}{T_t}\right) \tag{1}$$

An alternative implementation would be to use the estimated tracking signal $e_s$ to do "conditional integration". In such an implementation the integrator part is not updated if $e_s$ is larger than a threshold, i.e. if $|e_s| > e_{threshold}$ the integrator is not updated. This solution also prevents the integrator state to build up a large value in scenarios of power saturation.

One exemplary implementation of the tracking arrangement includes to filter $e_s$ and use a dead zone. This makes the impact of estimation errors smaller in the case when power is not saturated. The classical implementation of a dead-zone is a block with the following function (input: u, output: y, dead-zone parameter: $u_d$):

$$y = \begin{cases} u & \text{if } |u| \geq u_d \\ 0 & \text{if } |u| < u_d \end{cases} \tag{2}$$

The invention is a new application of the tracking approach to the windup problem. The major improvement compared to existing approaches are that the saturation is estimated by comparing $SIR_r$ and $SIR_{est}$ to produce a tracking signal e_s. The invention is applicable to transmission power control systems in both the up-link and the down-link.

The invention claimed is:

1. A method for controlling a radio frequency (RF) transmitter, the method comprising:

using an integrating controller to produce a reference value of a first quality measure from a first error signal wherein the first error signal is based on a reference value of a second quality measure and an estimated value of the second quality measure, wherein the integrating controller is one of a proportional integrating (PI) controller having the transfer function:

$$SIR_r = e^*K + \frac{1}{s}\left(\frac{e^*K}{T_i} + \frac{e_s}{T_t}\right)$$

in which $SIR_r$ is the reference value of the first quality measure, e is the error in quality measure, K is a constant, $e_s$ is the tracking signal and $T_i$ and $T_t$ are time constants relating to the integration and tracking unit respectively, or a proportional integrating derivative (PID) controller;

producing an estimated value of the first quality measure relating to an actual value of the first quality measure; and supplying a tracking signal related to the estimated value of the first quality measure and the reference value of a first quality measure to the integrating controller.

2. A method for controlling a radio frequency (RF) transmitter, the method comprising:

using an integrating controller to produce a reference value of a first quality measure from a first error signal wherein the first error signal is based on a reference value of a second quality measure and an estimated value of the second quality measure;

producing an estimated value of the first quality measure relating to an actual value of the first quality measure; and supplying a tracking signal related to the estimated value of the first quality measure and the reference value of a first quality measure to the integrating controller, wherein an adjusted tracking signal is set to zero when the tracking signal is within a predefined value range, the adjusted tracking signal being supplied to the integrating controller in place of the tracking signal.

3. A method as claimed in claim 2, wherein the adjusted tracking signal is set to zero if the absolute value of the tracking signal is less than a predetermined threshold value.

4. A method for controlling a radio frequency (RF) transmitter, the method comprising:

using an integrating controller to produce a reference value of a first quality measure from a first error signal wherein the first error signal is based on a reference value of a second quality measure and an estimated value of the second quality producing an estimated value of the first quality measure relating to an actual value of the first quality measure; and supplying a tracking signal related to the estimated value of the first quality measure and the reference value of a first quality measure to the integrating controller, wherein the integrating controller is operable to not update the integrator if the tracking signal indicates that an update would not be advisable, and wherein the integrating controller is operable to not update the integrator if the tracking signal indicates that the absolute value of the difference between the estimated value of the first quality measure and the reference value of the first quality measure is larger than a threshold.

5. A controller for controlling a radio frequency (RF) transmitter, the method comprising:

an integrating controller operable to produce a reference value of a first quality measure from a first error signal, wherein the first error signal is based on a reference value of a second quality measure and an estimated value of the second quality measure, wherein the integrating controller is one of a proportional integrating (PI) controller, having the transfer function:

$$SIR_r = e^*K + \frac{1}{s}\left(\frac{e^*K}{T_i} + \frac{e_s}{T_t}\right)$$

in which $SIR_r$ is the reference value of the first quality measure, e is the error in quality measure, K is a constant, $e_s$ is the tracking signal and $T_i$ and $T_t$ are time constants relating to the integration and tracking unit respectively, or a proportional integrating derivative (PID) controller, an estimator operable to produce an estimated value of the first quality measure relating to an actual value of the first quality measure; and a tracking unit operable to supply a tracking signal related to the estimated value of the first quality measure and the reference value of a first quality measure to the integrating controller.

6. A controller for controlling a radio frequency (RF) transmitter, the method comprising:

an integrating controller operable to produce a reference value of a first quality measure from a first error signal, wherein the first error signal is based on a reference value of a second quality measure and an estimated value of the second quality measure;

an estimator operable to produce an estimated value of the first quality measure relating to an actual value of the first quality measure; and a tracking unit operable to supply a tracking signal related to the estimated value of the first quality measure and the reference value of a first quality measure to the integrating controller, wherein the tracking unit is operable to produce an adjusted tracking signal which is set to zero when the tracking signal is within a predefined value range, the adjusted tracking signal being applied in place of the tracking signal.

7. A controller for controlling a radio frequency (RF) transmitter, the method comprising:

an integrating controller operable to produce a reference value of a first quality measure from a first error signal, wherein the first error signal is based on a reference value of a second quality measure and an estimated value of the second quality measure;

an estimator operable to produce an estimated value of the first quality measure relating to an actual value of the first quality measure; and a tracking unit operable to supply a tracking signal related to the estimated value of the first quality measure and the reference value of a first quality measure to the integrating controller, wherein the integrating controller is operable to not update the integrator if the tracking signal indicates that an update would not be advisable and wherein the integrating controller is operable to not update the integrator of the tracking signal indicates that the absolute value of the difference between the estimated value of the first quality measure and the reference value of the first quality measure is larger than a threshold.

8. A method according to claim 1, as implemented in a computer program product comprising code elements adapted to be executed on a computer.

* * * * *

UNITED STATES PATENT AND TRADEMARK OFFICE
CERTIFICATE OF CORRECTION

| | |
|---|---|
| PATENT NO. | : 7,373,117 B2 |
| APPLICATION NO. | : 10/528639 |
| DATED | : May 13, 2008 |
| INVENTOR(S) | : Nilsson |

Page 1 of 1

It is certified that error appears in the above-identified patent and that said Letters Patent is hereby corrected as shown below:

In Column 4, Line 53, delete "e_s." and insert -- $e_s$. --, therefor.

In Column 5, Line 45, in Claim 4, after "quality" insert -- measure; --.

Signed and Sealed this

Sixth Day of January, 2009

JON W. DUDAS
*Director of the United States Patent and Trademark Office*